M. J. BREEN.
CORN PLANTER.
APPLICATION FILED MAY 21, 1910.
1,051,075.
Patented Jan. 21, 1913.
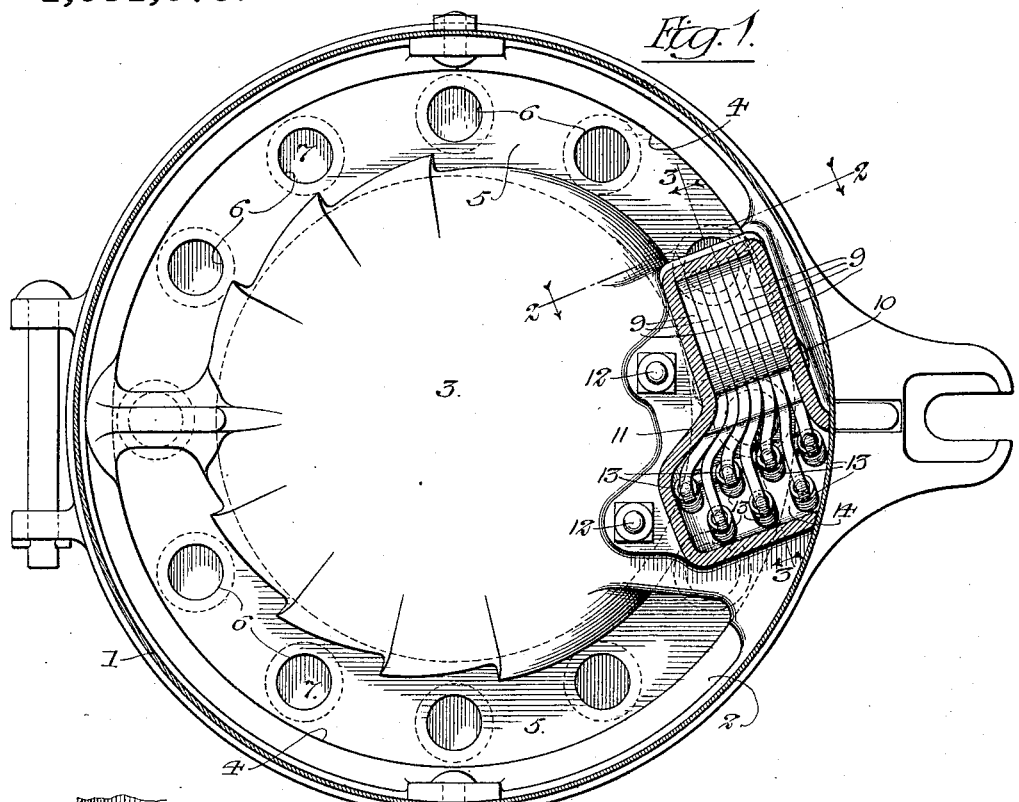
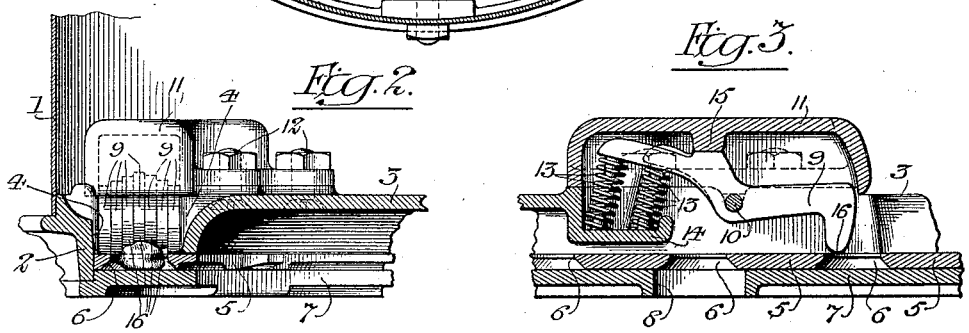
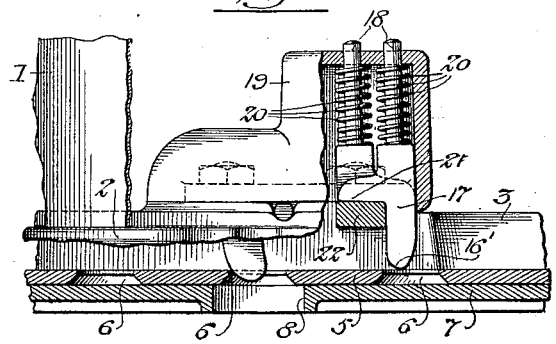

UNITED STATES PATENT OFFICE.

MICHAEL J. BREEN, OF ROCKFORD, ILLINOIS.

CORN-PLANTER.

1,051,075.

Specification of Letters Patent. Patented Jan. 21, 1913.

Application filed May 21, 1910. Serial No. 562,578.

*To all whom it may concern:*

Be it known that I, MICHAEL J. BREEN, a citizen of the United States, and a resident of Rockford, county of Winnebago, and State of Illinois, have invented certain new and useful Improvements in Corn-Planters, of which the following is a full, clear, and exact description.

The invention relates to corn planters and seeks to provide simple and effective means by which the accurate planting of the seed can be effected without necessitating the careful grading or selection of the seed employed with respect to the form of the individual kernels.

In the "check-row" planting of corn in hills, it is highly desirable that the same number of kernels, usually either three or four, shall be planted in each hill. In the endeavor to effect this accurate planting of the kernels, it is customary to employ a seed plate in the lower portion of the seed can or hopper of the planter which is provided with cells, each adapted to contain a single kernel and which plate is given a predetermined movement, as the planter travels between rows, to carry the desired number of cells over the discharge opening of the hopper, to thereby deliver the seed one at a time to the discharge chute or boot of the machine. The final delivery of the kernels thus accumulated one at a time in the boot or discharge chute, is effected at the cross rows by suitable valve mechanism under control of a check-row mechanism of the planter.

In order that the seed plate shall separate the proper number of kernels from the seed in the hopper and deliver the same to the discharge chute, it is necessary that the movement of the plate shall be sufficient to carry the proper number of cells thereof over the discharge opening at each operation, and that each cell shall contain one kernel, and only one, as it passes beneath the cut-off to the discharge opening. The seed plates employed having single kernel cells are either of the "edge-drop" or of the "flat-drop" type. In the first the cells are adapted to receive the kernels edgewise, and in the other, flatwise. In both forms the cells of the plate, in a sense, measure the kernels by their thickness or width from one flat face to the other, which is the most regular dimension of the kernels of corn. In both forms, the cells of the plate before reaching the discharge opening of the hopper, pass beneath a cut-off, the function of which is to scrape off or dislodge any kernels in excess in the cells. For accurate planting, both forms of seed plates require the greater or less careful grading of the seed and the elimination of all round or irregular kernels. The germinating power of the irregular kernels is as good as those of flat, regular form, but the round irregular kernels cannot enter the cells of the "edge-drop" plate. In the "flat-drop" type such round or irregular kernels, when in the cells of the plate, project above the surface thereof, so that they are usually cracked by the cut-off as they pass beneath the same, and their germinating power thus destroyed. If the cut-off were allowed to yield to permit the passage of such round or irregular kernels projecting from the cells, it would also be apt to permit the passage of seed in excess of the required number to the discharge opening. The grading of the seed is usually roughly effected by breaking off the butts and tips of the ears, but, even when this is done, it is necessary to further carefully select and grade the seed or many round and irregular kernels will be placed in the hopper of the machine and interfere with accurate planting.

The present invention provides simple and effective means whereby the round and irregular kernels will not interfere with the accurate planting of the seed and the necessity of carefully selecting the seed is thereby avoided. In accordance with the present invention, which is particularly applicable to plates of the "flat-drop" type, a flexible or multiple cut-off comprising a series of independent sections is employed, and this multiple cut-off is arranged to yield to permit the passage of round or irregular kernels to the discharge opening, but the independent sections of the cut-off conform to the outline of such kernels to thereby exclude seed in excess.

In the accompanying drawings, which illustrate two forms of the invention, Figure 1 is a plan view of a seed can or hopper bottom of a planter with the present improvement applied thereto, the seed can and the cut-off cover being shown in section. Figs. 2 and 3 are detail sections on the lines 2—2 and 3—3, respectively, of Fig. 1. Fig. 4 is a view similar to Fig. 3, illustrating a modified form of the invention.

The present improvement can be applied to different forms of seed hoppers. That shown in the drawings comprises a cylindrical body portion 1 secured at its lower end to a cast metal bottom comprising an annular portion or ring 2 and a central cap plate 3. The annular part or ring 2 and the cap plate 3 form the usual feed-way 4 of the hopper in the lower portion of which is arranged the annular seed plate 5, having a circular row of cells 6, each intended to receive a single kernel flatwise. In the particular form shown, the seed plate is held in position and the lower portions of the cells are closed by a bottom plate 7 having a discharge opening 8 at one point. The seed plate is rotated in any suitable manner to carry the proper number of cells over the discharge opening 8 at each operation, so that the kernels separated from the body of seed in the hopper and disposed flatwise within the cells 6 are delivered one at a time to the discharge opening. In prior constructions, a one-piece cut-off coöperates with the circular row of cells and is arranged in advance of the discharge opening to scrape off or remove seed in excess carried along by the cells of the plate. If this one-piece cut-off is held in position by a comparatively heavy spring and is properly shaped to perform this function, it is liable to crack or remove from the cells, any round or irregular kernels therein, so that either the fertility of such seed is destroyed or such seed do not properly pass to the discharge opening. If such a one-piece cut-off is allowed to yield to permit the passage of round and irregular kernels in the seed cells projecting above the surface of the plate, it would be apt to also permit the passage of seed in excess to the discharge opening.

In accordance with the present invention, the cut-off comprises a series of independent sections, each of which is considerably narrower than the seed cells of the plate and which extend across the feed-way above the path of movement of the cells of the plate.

In the form shown in Figs. 1 to 3 inclusive, the sections 9 of the multiple cut-off are arranged side by side and are mounted intermediate their ends upon a transverse pivot pin 10. A cover 11 extends over the sections 9 of the multiple cut-off and, in the form shown, is removably secured to the cap piece 3 by bolts 12. The rear ends of the cut-off sections 9 are separated and staggered in the form shown, and a series of coiled springs 13 extend between the rear ends of the sections and a supporting part or shelf 14. There is, of course, one of these springs for each section of the cut-off and they serve to hold the same in normal position with their rear ends abutting against a stop lug or rib 15 on the under side of the cover 11. The cut-off sections 9 are preferably provided with rounded or nose-like forward ends 16 which are normally held in engagement or closely adjacent the upper face of the seed plate 5. The number of the sections of the cut-off can, of course, be varied, but these sections are preferably quite narrow and preferably at least five or more are required in order that their combined width may be sufficient to extend across the feed-way of the hopper. The stop 15 prevents the forward ends of the narrow cut-off sections from projecting into the cells, but, as stated, hold them in contact or closely adjacent the upper surface of the plate. The springs 13, however, are comparatively light and the forward ends of the sections are rounded so that when engaged by any round or irregular kernel projecting from the seed cells they will yield to permit the passage of such kernels to the discharge opening. But, when so yielding, the flexible or multiple cut-off conforms closely to the outline of a round or irregular kernel, as indicated in Fig. 2, and the passage of seed in excess to the discharge opening is thereby prevented.

In the form shown in Fig. 4, the sections of the multiple cut-off, instead of being pivoted, are in the form of a series of sliding plungers having flattened, lower operative end portions 17 which are arranged side by side, and round upper ends 18 which extend through guide openings in the cover 19. Springs 20 coiled about the upper end portions of the cut-off sections or plungers hold the latter in position with shoulders 21 thereon engaging a stop piece 22, and with the lower rounded ends 16' of the cut-off sections in contact with or closely adjacent the upper face of the seed plate 5. This form acts in a similar manner to permit the passage of round or otherwise irregular kernels projecting from the cells, but prevents the passage of kernels in excess. The pivoted form illustrated in Figs. 1 to 3 inclusive, is somewhat preferable, since it will operate with less friction.

It is obvious that the improvement can be applied to different types of seed hoppers and that the details of construction set forth can be widely varied without departure from the essentials of the invention, as defined in the claims.

I claim as my invention:—

1. In a corn planter, the seed hopper having an annular feed-way and a discharge opening in its bottom, a seed plate in the bottom of said hopper having a single, circular row of seed cells at the lower portion of said feed-way, each of said cells being adapted to receive a single kernel flatwise and a flexible cut-off comprising a series of independently spring-held sections arranged in contact side by side across said feed-way and coöperating with said single row of seed cells, said sections being each considerably narrower than said cells and having a combined width greater than said cells and said sections being arranged to closely conform to the outline of the irregular kernels in said cells to permit the passage thereof to said discharge opening while excluding kernels in excess, substantially as described.

2. In a corn planter, the seed hopper having an annular feed-way and a discharge opening in its bottom, a seed plate in the bottom of said hopper having a single, circular row of seed cells at the lower portion of said feed-way, each of said cells being adapted to receive a single kernel flatwise and a multiple cut-off comprising a series of independent sections arranged in contact side by side across said feedway, a series of separate springs one for each of said sections, a stop against which said sections are normally held by said spring, said multiple cut-off coöperating with said single row of cells and arranged to yield to permit the passage of irregular kernels in said cells while closely conforming to the outline of such irregular kernels to exclude kernels in excess, substantially as described.

3. In a corn planter, the seed hopper having an annular feed-way and a discharge opening in its bottom, a seed plate in the bottom of said hopper having a single, circular row of seed cells at the lower portion of said feed-way, each of said cells being adapted to receive a single kernel flatwise, a multiple cut-off comprising a series of independent sections, each considerably narrower than said cells and arranged in contact side by side across said feed-way, and having a combined width greater than said cells, said sections having rounded end portions arranged to be engaged by irregular kernels projecting from said cells, a series of separate comparatively light springs one for each of said sections, a stop against which said sections are held by said spring, said sectional cut-off coöperating with said single row of seed cells and arranged to yield to permit the passage of irregular kernels in said cells while closely conforming to the outline thereof to exclude kernels in excess, substantially as described.

MICHAEL J. BREEN.

Witnesses:
BERNARD J. SHANLEY,
LILIE SUEHR.

---

Copies of this patent may be obtained for five cents each, by addressing the "Commissioner of Patents, Washington, D. C."